M. W. MASTIN.
DEVICE FOR HANGING PICTURES.
APPLICATION FILED APR. 1, 1916.
1,197,139.
Patented Sept. 5, 1916.
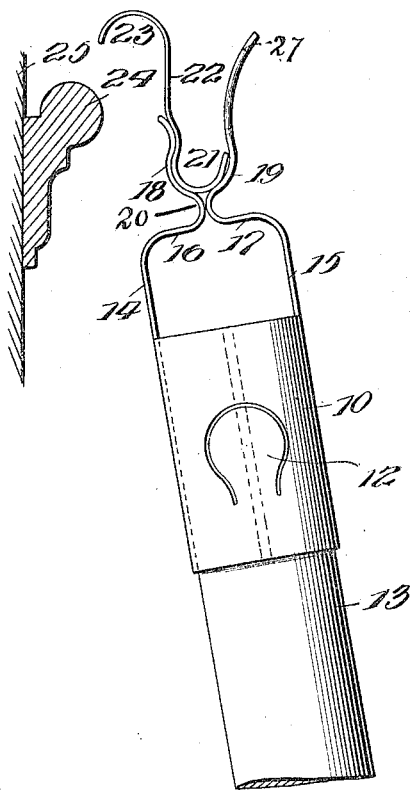
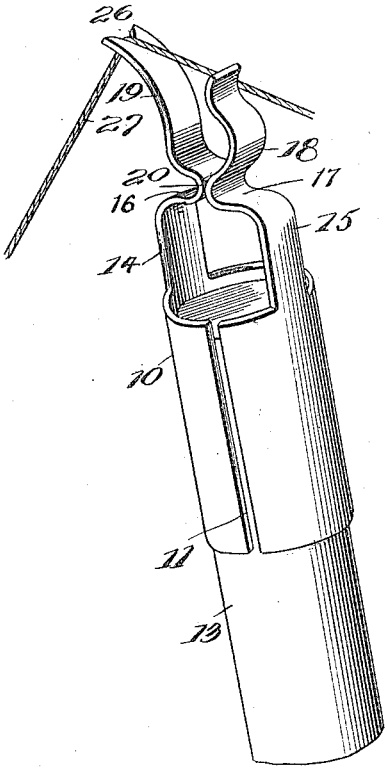
Inventor
Mignon W. Mastin
By
Attorneys

UNITED STATES PATENT OFFICE

MIGNON W. MASTIN, OF GRAND VIEW, TEXAS, ASSIGNOR OF ONE-FOURTH TO ESTILL C. GUERRANT, OF MARIANNA, ARKANSAS, AND ONE-FOURTH TO SOPHIE G. WOODSON, OF MEMPHIS, TENNESSEE.

DEVICE FOR HANGING PICTURES.

1,197,139.      Specification of Letters Patent.      Patented Sept. 5, 1916.

Application filed April 1, 1916. Serial No. 88,375.

*To all whom it may concern:*

Be it known that I, MIGNON W. MASTIN, a citizen of the United States, residing at Grand View, in the county of Johnson and State of Texas, have invented certain new and useful Improvements in Devices for Hanging Pictures, of which the following is a specification.

This invention relates to devices employed for use in hanging pictures to picture rails and likewise for removing the pictures therefrom, and has for one of its objects to provide a simply constructed device whereby the suspension hooks may be suspended from the rail and the picture suspended from the hooks by its cord or wire and removed therefrom from the floor without the necessity of employing step ladders or like devices.

With these and other objects in view, the invention consists in certain novel features of construction, as hereinafter shown and described and then specifically pointed out in the claims; and in the drawings illustrative of the preferred embodiment of the invention Figure 1 is a side elevation of the improved device, together with a sectional detail of a conventional picture rail with a suspension hook supported in the device; Fig. 2 is a perspective view of the improved device illustrating the manner whereby the picture cord or wire is disposed in the picture suspension hook.

Corresponding and like parts are referred to in the following description and indicated in all the views of the drawings by the same reference characters.

The improved device comprises a ferrule or socket 10, preferably divided longitudinally, as illustrated at 11 at one side and provided with an integral friction spring or tongue 12 at the opposite side. By this means the ferrule or socket may be frictionally engaged with a rod, a portion of which is represented at 13, of any required length and of any suitable size. For an ordinary height of room the rod 13 will probably be five or six feet in length, but the length of the rod may be varied as required. Projecting from the outer end of the ferrule or socket 10 are arms 14—15. The arms are bent inwardly toward each other, as shown at 16—17. The arm 16 is then bent outwardly to form a half socket or clip 18, while the arm 17 is extended, as shown at 19, to form an opposing half socket or clip 19. The portions of the arms between the clip members 18—19 and the inwardly directed portions 16—17 approach each other closely, as indicated at 20, to form a receptacle for the cord or wire receiving portion 21 of a picture hook, the body of the hook being represented at 22 and the rail engaging portion at 23. The rail or molding is represented conventionally at 24 and attached to the wall, a portion of which is indicated at 25. The portion 19 of the arm is extended beyond the portion 18 and is provided in its outer end with a V-shaped notch 26 to receive the picture cord or wire, a portion of which is indicated conventionally at 27.

In using the improved device the picture hook is inserted in the implement, as indicated in Fig. 1, with the arm 18 toward the rail engaging hook 23. In this position the hook may be readily disposed over the rail 24, as will be obvious, and after the hook 23 has been engaged with the rail the implement may be forcibly moved downwardly to detach the device from the picture hook and leave the latter in position upon the picture rail. The cord or wire 27 of the picture is then engaged in the notch 26 of the member 19 and elevated until it is above the smaller hook 21 then it may be readily lowered into the hook 21 and the implement detached by a downward movement. To remove a picture it is only necessary to engage the notch 26 of the implement with the cord at one side of the picture hook and move the same, together with the picture, upwardly until detached from the hook when it can be readily lowered.

The improved implement is simple in construction can be inexpensively manufactured of any suitable material, but will preferably be of brass and may be plated, galvanized or otherwise ornamented or protected.

Having thus described the invention, what is claimed as new is:

1. An implement of the class described including coacting resilient members having half sockets in their confronting faces adapted to frictionally support the cord receiving portion of a picture hanging hook, one of said members being extended in advance of the other and the extended end provided with an outwardly opening recess to receive a picture cord.

2. An implement of the class described comprising a ferrule adapted to engage a rod and having coacting resilient members extending therefrom and provided with half sockets in their confronting faces adapted to frictionally support the cord receiving portion of a picture hanging hook, one of said members being extended in advance of the other and the extended end provided with an outwardly opening recess to receive a picture cord.

In testimony whereof I affix my signature.

MIGNON W. MASTIN. [L. S.]

Copies of this patent may be obtained for five cents each, by addressing the "Commissioner of Patents, Washington, D. C."